(12) United States Patent
Gomes et al.

(10) Patent No.: US 12,399,732 B2
(45) Date of Patent: Aug. 26, 2025

(54) ADJUNCT PROCESSOR (AP) DOMAIN ZEROIZE

(71) Applicant: INTERNATIONAL BUSINESS MACHINES CORPORATION, Armonk, NY (US)

(72) Inventors: Louis P. Gomes, Poughkeepsie, NY (US); Richard John Moore, Waterlooville (GB); Klaus Paul Werner, Moetzingen (DE)

(73) Assignee: International Business Machines Corporation, Armonk, NY (US)

( * ) Notice: Subject to any disclaimer, the term of this patent is extended or adjusted under 35 U.S.C. 154(b) by 739 days.

(21) Appl. No.: 17/644,598

(22) Filed: Dec. 16, 2021

(65) Prior Publication Data
US 2023/0195490 A1    Jun. 22, 2023

(51) Int. Cl.
*G06F 9/455* (2018.01)
(52) U.S. Cl.
CPC ............... *G06F 9/45558* (2013.01); *G06F 2009/45587* (2013.01)
(58) Field of Classification Search
None
See application file for complete search history.

(56) References Cited

U.S. PATENT DOCUMENTS

| | | |
|---|---|---|
| 6,108,425 A | 8/2000 | Smith, Sr. |
| 9,160,539 B1 | 10/2015 | Juels |
| 9,405,708 B1 | 8/2016 | Pohlack |

(Continued)

FOREIGN PATENT DOCUMENTS

TW    334540 B    12/2010

OTHER PUBLICATIONS

International Searching Authority, "Notification of Transmittal of the International Search Report and the Written Opinion of the International Searching Authority, or Declaration," Patent Cooperation Treaty, Mar. 17, 2023, 12 pages, International Application No. PCT/EP2022/085094.

(Continued)

*Primary Examiner* — Bradley A Teets
*Assistant Examiner* — Melissa A Headly
(74) *Attorney, Agent, or Firm* — Teddi E. Maranzano

(57) ABSTRACT

A method, computer program product, and computer system are provided. A machine hypervisor builds and enqueue a zeroize adjunct processor (AP) domain (ZAPD) common command request message to a target AP domain queue. Machine firmware validates the enqueued common command request message on the target AP domain queue. The machine firmware converts the ZAPD command request to the mode-specific form of the domain zeroize request. A command request message is executed at an AP crypto adapter of the target AP domain. Executing includes zeroizing a storage area of the AP crypto adapter. The execution results are returned to the machine firmware. The machine firmware converts the crypto card mode's ZAPD command reply message into the common ZAPD command reply message. The final execution results including the converted common ZAPD command reply message are returned to the machine hypervisor.

20 Claims, 6 Drawing Sheets

(56) References Cited

U.S. PATENT DOCUMENTS

| | | | |
|---|---|---|---|
| 2011/0055560 A1* | 3/2011 | Meissner | G06F 21/602 |
| | | | 713/189 |
| 2016/0127336 A1* | 5/2016 | Cignetti | H04L 63/061 |
| | | | 713/171 |
| 2016/0127663 A1 | 5/2016 | Natori | |
| 2019/0228163 A1 | 7/2019 | Lang | |

OTHER PUBLICATIONS

Gomes, et al., "Adjunct Processor (AP) Domain Zeroize," Application and Drawings, Filed on Dec. 9, 2022, 30 Pages, Related US Patent Application Serial No. PCT/EP2022/085094.

IBM, "Getting started with TKE at your enterprise," Apr. 6, 2021, 50 pages, V2, IBM Corp., Retrieved from the Internet: <URL: https://www-40.ibm.com/servers/resourcelink/svc00100.nsf/pages/zOSV2R4izst100/$file/izst100_v2r4.pdf>.

Intellectual Property Office, Ministry of Economic Affairs, "Notification of Office Action," May 19, 2023, 8 pages, Related TW Patent Application Serial No. 111133128, [Machine Tranlsated].

Ben-Menahem, et al., "Multi-Cryptosystem Secure Token Interface," IP.com, Jan. 17, 2006, 9 pages, IP.com No. IPCOM000133194D.

Bobinac, "SafeNet HSM solutions for secure virtual amd physical environments," SafeNet, Oct. 1, 2013, 23 pages, Prague, CZ, retrieved from the Internet: <URL: https://www3.thalesgroup.com/events/2013/SafeNetExecDayPrague/pdf/Afternoon/Marko%20Bobinac%20-Why_a_Root_of_trust_of_your_physical_&_virtual_envirt_is_needed.pdf>.

Disclosed Anonymously, "Live Migration of Crypto Domains of local HSMs," IP.com, Dec. 16, 2014, 4 pages, IP.com No. IPCOM000239930D.

Disclosed Anonymously, "Master Key synchronization and replication," IP.com, Oct. 30, 2020, 3 pages, IP.com No. IPCOM000264005D.

Disclosed Anonymously, "Support for Secure Virtual Machines and for Secure Applications," IP.com, Nov. 5, 2019, 5 pages, IP.com No. IPCOM000260232D.

Inci, et al., "Seriously, get off my cloud! Cross-VM RSA Key Recovery in a Public Cloud," IACR Cryptology ePrint Archive, 2015, 15 pages, Retrieved from the Internet: <URL: https://eprint.iacr.org/2015/898.pdf>.

Ramakrishna, "Virtualization Security Issues and Mitigations in Cloud Computing, " Proceedings of the First International Conference on Computational Intelligence and Informatics, Jan. 2017, 13 pages, ResearchGate, Retrieved from the Internet: <URL: https://www.researchgate.net/publication/311215879_Virtualization_Security_Issues_and_Mitigations_in_Cloud_Computing>.

* cited by examiner

ADJUNCT PROCESSOR (AP) DOMAIN ZEROIZE

BACKGROUND

The present invention relates to computer systems, and more specifically to zeroizing an adjunct processor domain.

A machine's hypervisor manages its guests (VMs) and their resources. For machines configured with an AP cryptographic adapter, a guest's secret security keys are loaded and stored in one or more AP cryptographic adapter domains. The machine's hypervisor manages its guests and their resources. A guest's secret keys must be removed from the AP cryptographic adapter domain to ensure that a future guest being configured with the AP cryptographic adapter does not have access to the previous guest's secret keys. However, the machine hypervisor does not have a means to delete its guest's secret keys from the AP cryptographic adapter domain.

It would be advantageous to provide the hypervisor with secure access to delete a guest's secret keys from the AP cryptographic adapter domain after removing the guest, to ensure no other guest can access the secret keys in the future.

SUMMARY

A method is provided. A machine hypervisor builds and enqueues a zeroize adjunct processor (AP) domain (ZAPD) common command request message to a target AP domain queue. Machine firmware validates the enqueued common command request message on the target AP domain queue. The machine firmware converts the ZAPD command request to the mode-specific form of the domain zeroize request. A command request message is executed at an AP crypto adapter of the target AP domain. Executing includes zeroizing a storage area of the AP crypto adapter. The execution results are returned to the machine firmware. The machine firmware converts the crypto card mode's ZAPD command reply message into the common ZAPD command reply message. The final execution results including the converted common ZAPD command reply message are returned to the machine hypervisor.

Embodiments are further directed to computer systems and computer program products having substantially the same features as the above-described computer-implemented method.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
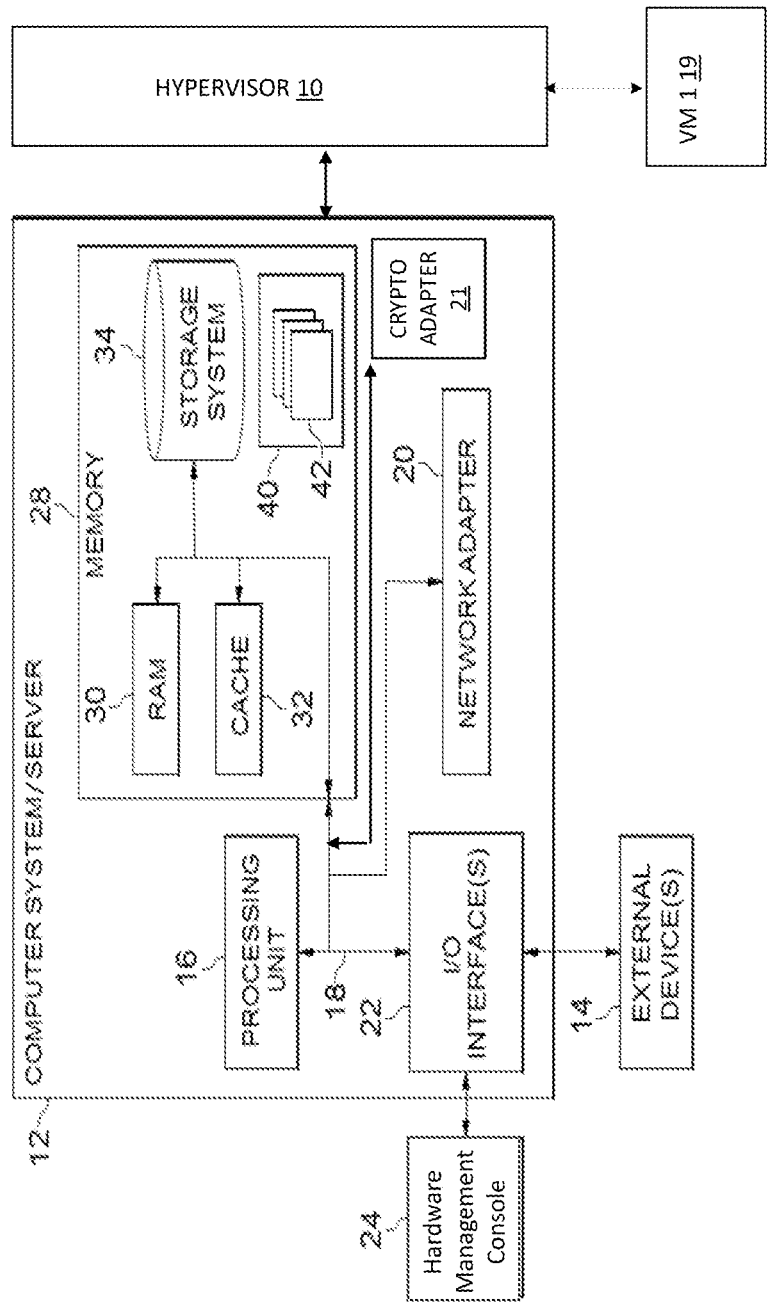
FIG. 1 is a functional block diagram of an illustrative system, according to an embodiment of the present invention.

Embodiments of the present invention may be implemented on computer hardware and software that support virtual machines (VM) that are configured with AP crypto adapters. Here, the contexts of z/VM® and z/Architecture® are used to facilitate understanding of the elements of the present invention. (z/VM® and z/Architecture® are registered trademarks of IBM in the United States).

It should be noted that hypervisors do not typically perform direct cryptographic operations. Instead, hypervisors administer the assignment of cryptographic resources to virtual machines. The ZAPD command as embodied in the present invention provides a great convenience for hypervisors in performing this administration task. A domain zeroize (DZ) connectivity programming request block (CPRB) request message can be built by the program (e.g., hypervisor, operating system) and issued directly using a regular form of the NQAP instruction without resorting ZAPD. Because DZ is a destructive administrative command the issuer of DZ must have authority to use this request. That authority is granted when the issuer starts a signed session with the AP crypto adapter. Effectively the issuer logs on to the card and issues DZ to the domains it is permitted to zeroize. ZAPD is a configuration mode-independent abstraction of DZ as illustrated using the example of the IBM z/Architecture®, ZAPD provides a simplification to the interface to DZ by not requiring the hypervisor to start a signed session with the AP crypto adapter. Instead the central processor complex (CPC) firmware ensures that ZAPD only operates on domains assigned to the hypervisor's VM to which the hypervisor usage and control authority is granted. The i390 firmware acts as the proxy issuer of DZ for the hypervisor. It has authority which allows it to operate on any domain assigned to any LPAR. Because of this i390 must ensure that it does not perpetrate a security violation in allowing the hypervisor access to its ability to issue DZ to any domain.

Each of the hypervisors has available to it all of the functions and facilities (also referred to herein collectively as "resources") of the computer on which it is executing. The hypervisor exposes a set of the resources to the VMs and provides a mechanism for ensuring that operations and modifications of the VMs occur in a controlled and predictable manner. The resources include software instructions, machine code instructions, microcode and millicode instructions, and/or physical hardware capabilities, including one or more Cryptographic Express PCIe (CEX) adapters.

Conceptually, a CEX adaptor is assigned a unique number, which is its adjunct processor number (APn 0-255). Within each APn there may be assigned up to 256 logically independent processing facilities known as domains. The APn and domain number pair uniquely identifies a CEX crypto resource with which to process work. Each such pair is served by a work queue which may comprise up to 32 elements, with each element containing at most one request message or its corresponding response message. The number of APn and elements are exemplary, and may vary to include more or fewer, depending on the architectural implementation. Each such queue is known as an AP queue (APQ) and is uniquely identified by the APn and Domain number of the resource it serves. The concatenated AP and domain numbers may be referred to as the APQN, serve to identify the associated queue.

Three z/Architecture AP instructions use the APQN to address a specific processing cryptographic resource. Of the three instructions:

NQAP (Enqueue Adjunct Processor) places a request message segment on an addressed APQN. Status information is returned in the APQSW to indicate the success of the request. Once the last segment of the current request is placed on the APQ, the NQAP instruction completes, and the message request is processed asynchronously. (A work request may be delivered as a number of segments, each requiring separate NQAP instructions. Where multiple segments are needed, the instruction returns the APQ index or entry number (APEX) on successfully receiving the first segment. Subsequent segments require that the associated APEX be specified with the request.) When an entire message is assembled, the CEX adapter is able to be process it. Segmenting may occur at the instigation of either the program or the machine.

DQAP (Dequeue Adjunct Processor) removes the next ready reply message, in segments, from the addressed APQN. Status information is returned in the APQSW of the last segment of the current reply to indicate the success of the reply. Once a reply has been successfully removed, the associated queue element of the APQ becomes free to be used for a subsequent request. Replies may be returned in multiple segments, each requiring a separate DQAP to receive each segment. The first DQAP returns the APEX, which each subsequent DQAP specifies to retrieve the remaining message segments.

PQAP (Process Queue Adjunct Processor) is used in a number of querying and configuration functions relating to individual APQNs, or the entire set of APs and Domains assigned to the program. Once such query function is Test AP Queue (TAPQ), which returns configuration and operational status information about the APQN. The TAPQ also returns whether the associated queue is full or empty and whether the queue is configured for adapter interruptions. This information may be returned in one of the general purpose register operands used.

The CEX adapter may be configured in one of three mutually exclusive modes (accelerator, XCP and CCA), which have no commonality from a programming perspective. Additionally, each mode has a different message structure.

In addition to operating in one of three modes each mode has a different message structure. Thus, a user (e.g., a program, operating system) builds and enqueues three distinct command structures and the hypervisor builds and dequeues three distinct reply structures, one for each configured mode, impacting performance through redundant processing.

Commands to the AP crypto adapter can require two different levels of authority. Functional commands, such as program APIs and cryptography requests require usage authority. Configuration of the cryptographic environment requires control authority. This group of commands includes configuring domain master keys, and zeroizing an AP cryptographic adapter domain. The zeroizing operation removes a VM's secret keys to ensure that a future VM being configured with the same AP cryptographic adapter does not have access to the previous VM's restricted data that remains on the adapter. Residual data occurs when the VM having the AP crypto adapter in its configuration is deactivated or removed. Exposure of residual data also occurs when an AP crypto adapter that was a dedicated resource to one VM is redeployed from that VM to a shared pool where it is accessible to several VMs.

An administrator having the appropriate security authorization accesses the cluster's hardware management console (HMC) to define and modify VMs, assign servers to domains, and assign hardware, particularly cryptographic adapters, to host servers and VMs. The administrator also performs the zeroizing operation from the HMC. Thus, an administrator with access to the HMC can perform all operations on all partitions and all hardware, which is an overly liberal level of access.

To address issues of security and performance, embodiments of the present invention introduce an intermediate level of access whereby a VM is given restricted administrative access only to its resources from the host server, and a common request/reply message format is provided.

A non-crypto adapter command, here called zeroize AP domain (ZAPD), is provided to delete the VM's secret keys from the AP crypto adapter domain. This administratively restricts access to the zeroize operation to only the target domain and is agnostic to the content of the messages and to the configuration mode of the adapter. ZAPD is not automatically available in the computing environment. An enterprise may make the policy decision whether or not to install ZAPD, based on how sensitive the enterprise considers the data. If the data is considered sensitive/secret, the enterprise can install ZAPD and define the circumstances under which the command can be used. A facility bit (AC indicator) is added to the AP architecture that software can query to discover whether ZAPD is supported for the AP crypto adapters.

The software creates a ZAPD request message using a common request message format. Upon receiving the message, the hypervisor builds a ZAPD request message and sets an indicator that this is an administrative command that requires control authority. The hypervisor sets the APQN of the target domain.

The machine firmware intercepts the hypervisor's request message and converts it into the format corresponding to the configured mode of the AP crypto adapter command request message. The AP crypto adapter then validates and executes the command request message and returns the execution results. An AP crypto adapter error code is stored in the reply connectivity programming request block (CPRB) of the AP crypto adapter's command reply message if the command execution is unsuccessful. The machine firmware generates a command reply message that the machine hypervisor understands based on the crypto card's command reply message. If a crypto card error code is stored in the reply CPRB, then the machine firmware returns machine failure AP command reply code into the AP reply code field as well as the actual crypto card error code returned by the crypto card in a new error return code (ERC) field to the machine hypervisor.

The common request/reply message format addresses the issue of a separate message format for each configuration mode. Generally, the hypervisor is not involved with the message content, which is complex and is processed by several components of the server and the AP crypto adapter. A hypervisor's interest is limited to administration of resources and VMs. A broader role can cause the hypervisor to become involved in intercepting, examining, and possibly reissuing any message the hypervisor evaluated as being authorized. This can introduce a security exposure, in addition to impacting performance, since the hypervisor is now acting as more than an intermediary.

Therefore, the described embodiments provide that the authorized user, such as the system the administrator, can zeroize in secret, according to the installation's policy.

Referring now to the figures, FIG. 1 is a functional block diagram of an illustrative virtualized environment (system) 100, according to an embodiment of the invention.

As shown, the system 100 includes one or more computer system/servers (server) 12, one of which is shown. The server 12 may include any computer capable of including a hypervisor 10, which enables virtualizing the server 12 hardware to support one or more optional virtual guests, such as VM1 19.

The functions and processes of server 12 may be described in the context of computer system-executable instructions, such as program modules, routines, objects, data structures, and logic, etc. that perform particular tasks or implement particular abstract data types. The server 12 can be part of a distributed cloud computing environment, and may enable creation of multiple VMs, when a hypervisor 10 is installed on the server 12.

As shown in FIG. 1, the server 12 may include, but is not limited to, one or more processors or processing units 16, a system memory 28, and a bus 18 that couples various system components including system memory 28 to processor 16.

Bus 18 represents one or more of several types of bus structures, including a memory bus or memory controller, a peripheral bus, an accelerated graphics port, and a processor or local bus using any of a variety of bus architectures.

The server 12 typically includes a variety of computer system readable media. Such media may be any available media that is accessible by computer system/server 12, and it includes both volatile and non-volatile media, removable and non-removable media.

The memory 28 can include computer system readable media in the form of volatile memory, such as random access memory (RAM) 30 and/or cache memory 32. The memory 28 may include a hardware system area, which is indirectly accessible and not visible to programs executing on the processor 16. Here, indirectly accessible is used to mean that the hardware system area and the adjunct processor queue(s) stored in the hardware system area are only accessible by specific limited instructions and not otherwise accessible (e.g., cannot load into it, programs are unaware of addresses, etc.). Located within the memory 28 are one or more adjunct processor queues. These queues are not directly visible from user programs and are instead considered a part of the processor 16, memory 28, and adjunct processor(s) (crypto adapter 21).

A processor 16 has access to the queues in memory 28 by, for instance, issuing instructions to place requests on the queue, and/or to remove replies from the queue. The adjunct processor has direct access to the queues via a transport layer and takes requests off the queue, processes the requests, and places replies to the requests on the queue. Therefore, the message flow may comprise the program issuing AP instructions to a queue that is actually in the hardware system area, potentially 256 queues having 32 elements each. The transport layer firmware validates a request to the extent possibly within the constraints of performing real I/O to the bus connected to the crypto adapter 21 and sends the request to the firmware on the crypto adapter 21.

The server 12 may further include other removable/non-removable, volatile/non-volatile computer system storage media. For example, storage system 34 can include a non-removable, non-volatile magnetic media, e.g., a "hard drive" and an optical disk drive for reading from or writing to a removable, non-volatile optical disk such as a CD-ROM, DVD-ROM or other optical media. Each device in the storage system 34 can be connected to bus 18 by one or more data media interfaces, such as I/O interface 22.

Each program 40 represents one of a plurality of programs that are stored in the storage system 34 and are loaded into the memory 28 for execution. A program 40 includes an instance of an operating system, an application, a system utility, or similar. Each program 40 includes one or more modules 42. Upon activation of the VMs, the hypervisor 10 can cause the profiles of the various VMs to load into hypervisor 10 memory, where they populate the configuration parameters and resources of the VMs. It should be noted that even when the server 12 includes the hypervisor 10, a VM is not required. In that case, the physical resources of the server 12 are not virtualized.

The server 12 may also communicate with one or more external devices 14 such as a keyboard, a pointing device; and/or any devices (e.g., network card, modem, etc.) that enable the server 12 to communicate with one or more other computing devices. Such communication can occur via Input/Output (I/O) interfaces 22.

Figure 2:
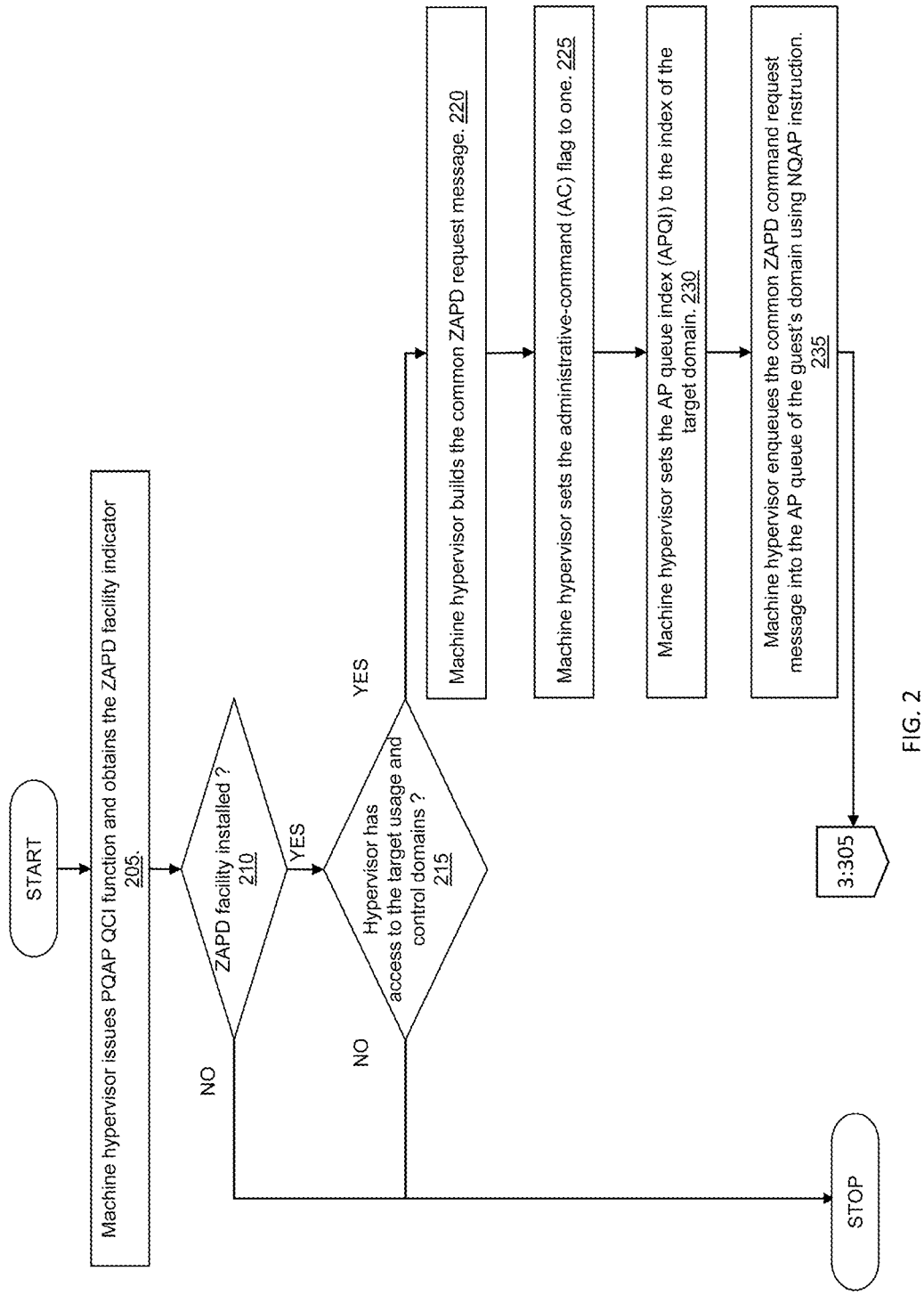
FIG. 2 illustrates a view of the machine hypervisor building and enqueuing a zeroize command request to the target AP queue, according to an embodiment of the present invention.

FIG. 2 illustrates the hypervisor process of issuing a ZAPD command. Generally, software queries for the presence of the ZAPD installation, as well as whether usage and control domain accesses are enabled for the target domain. The hypervisor builds a common request message and includes an indicator that this is an administrative command. The hypervisor sets the AP index and the APQ index of the domain to be zeroized in the command request message, and enqueues the command request message. Each AP is referenced by a unique index; each AP is partitioned into cryptographic processing environments called domains, each of those being referred to by a domain index; each domain of each AP is served by a queue and uniquely identified by the pair (AP index, Domain index)—often referred to as and AP Queue number or APQN. Domain index is often referred to as the APQ index. Therefore, the ZAPD operates on only one domain of one AP.

In FIG. 2, at 205 the hypervisor issues a PQAP QCI function to the target APQN to query whether the ZAPD facility is installed. The hypervisor receives the command reply message containing the query response. If at 210, ZAPD is not installed, processing ends.

If ZAPD is installed, at 215 the hypervisor checks whether the usage and control domains are enabled for the target domain. The usage domains and control domains are each organized as bitmaps, one entry corresponding to a target domain. The AP queue index value is used to access the bitmaps to locate the bit settings for the target domain's usage domain and control domain.

If at 215, the usage domain and control domain bits are not set, then the hypervisor does not have the accesses, processing ends.

At 220, the hypervisor builds the common command request message specifying the ZAPD command. At 225, the hypervisor also sets an administrative command (AC) indicator in a register, e.g., GR0, to indicate this is an administrative command and requires special handling. The AC indicator is a convenience for the processor firmware. Normally, requests which in the first stage are interpreted by millicode are subject to usage or control validation but not both. The AC indicator removes the need for millicode to parse the command request structure for an underlying command that needs both usage and control validation.

The hypervisor also sets the APQI of the target domain in the command request message (230). The APQI corresponds to a given domain number within the AP crypto adapter. At 235, the hypervisor enqueues the common command request message to the AP queue of the target domain using the NQAP instruction. The common command request message is delivered to an internal queue in the computer's hardware system area (HSA). A separate piece of computer firmware processes that queue. Following validation, the request is sent to firmware on the AP crypto adapter, which routes the request to the AP crypto adapter's crypto chip, or one of the crypto chip's agents. Failure indicators, reply codes, and reason codes may be returned as replies to the message initiation.

Figure 3:
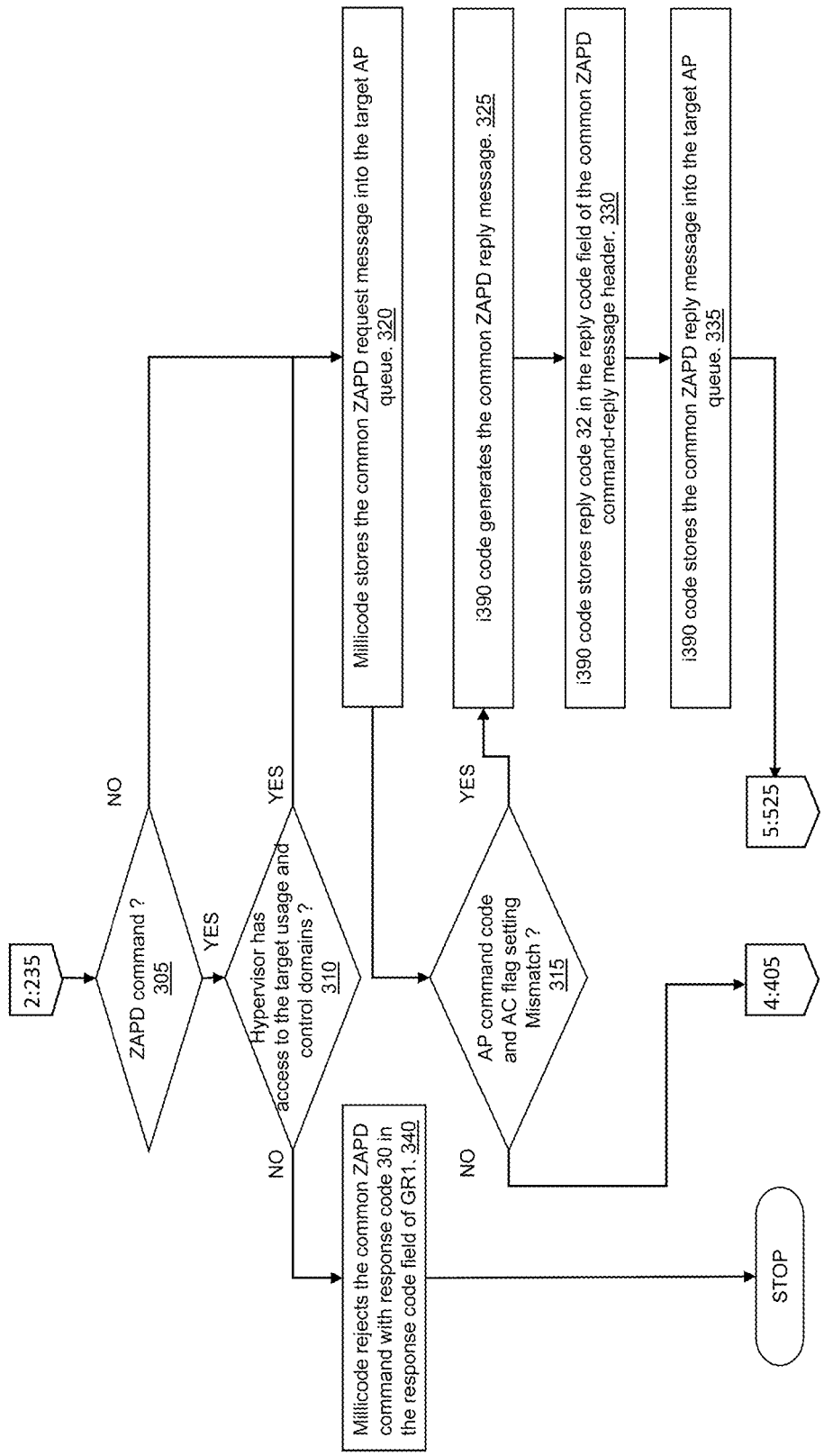
FIG. 3 illustrates a view of the machine firmware validating an enqueued zeroize command request message, according to an embodiment of the present invention.

FIG. 3 illustrates the CPC firmware handling of a ZAPD command from the hypervisor. a view of validating an enqueued zeroize command request message. Generally, the hypervisor checks what command is being requested. For non-ZAPD commands, a common request message is generated and enqueued to the target AP queue. The reply message is processed depending on the results of the command execution.

At 305, the hypervisor determines a processing path depending on the nature of the requested command. For non-ZAPD commands (305), millicode stores the common request message into the AP queue of the target domain (320). At 315, the hypervisor tests for the presence of an inconsistent command code attribute error from i390 firmware. The error being present in the command reply message header indicates that either this is not ZAPD but the AC indicator is set, or that this is ZAPD but the AC indicator is not set. In that case, i390 firmware generates the common ZAPD reply message at 325. The i390 firmware stores a reply code, for example "32", in the header of the common command reply message (330), and stores the common command reply message into the target AP queue (335).

Returning to 305, for ZAPD the hypervisor, by checking the usage and control domain bitmaps, determines that the hypervisor has the required access for the AP target domain (310). If the hypervisor has the required accesses, then processing joins the path of storing the common command request message and generating the common reply message. At 310, if the hypervisor does not have the required accesses, then at 340 millicode rejects the ZAPD with a response code, for example "30", which is stored in an architected location, such as GR1, and processing ends. If no error is returned at 315, processing proceeds to FIG. 4.

Figure 4:
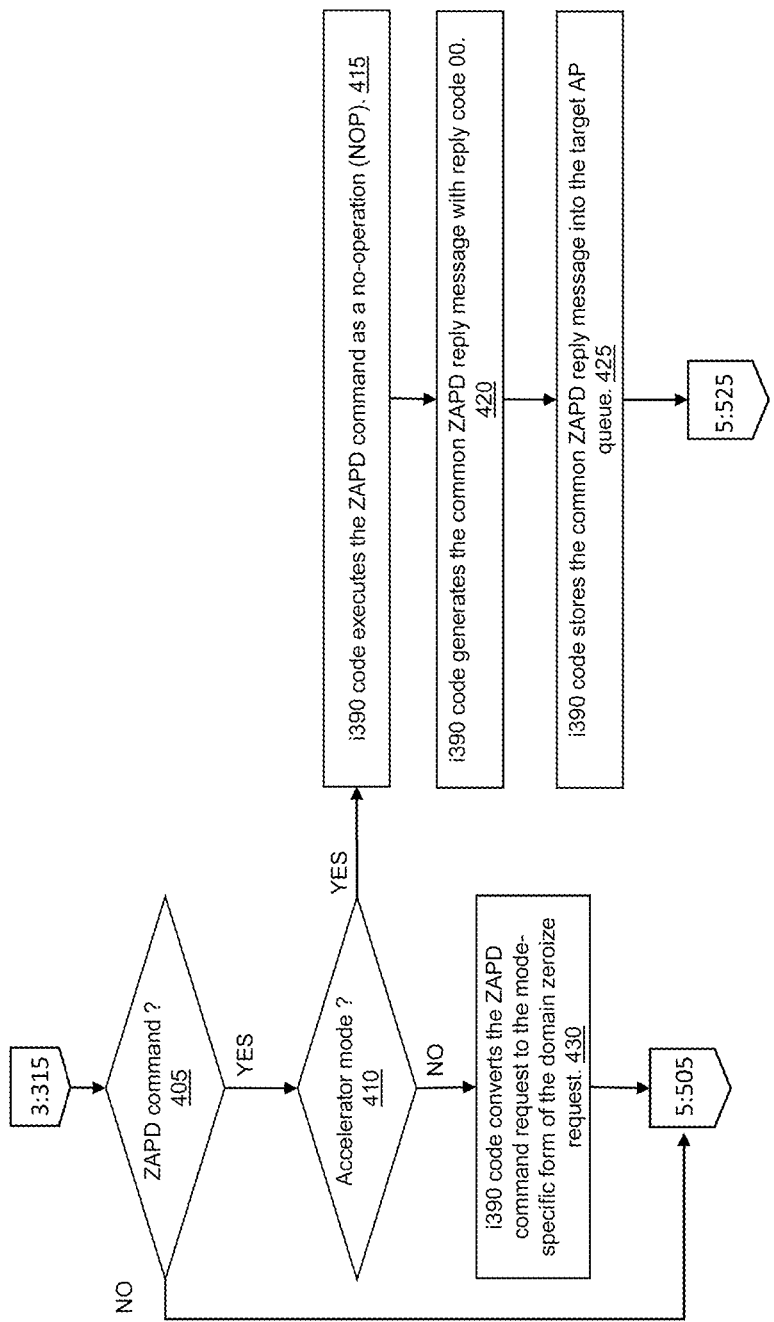
FIG. 4 illustrates a view of machine firmware either converting an enqueued zeroize command request message or executing the ZAPD command, generating the ZAPD command reply message and storing the common ZAPD reply message into the target AP queue, according to an embodiment of the present invention.

FIG. 4 illustrates a view of validating an enqueued zeroize command request message, according to an embodiment of the present invention.

Generally, the hypervisor checks what command is being requested. For non-ZAPD commands, a common request message is executed, and the common request reply message is generated and returned to the caller.

At 405, for a non-ZAPD command, the request reply is generated and returned to the caller. For a ZAPD command, if the AP crypto adaptor is configured in accelerator mode (410) the i390 firmware simulates the execution of the command as a non-operation because secret keys are not architected for accelerator mode (415). However, i390 firmware simulates the execution and the execution results that the AP crypto adapter would have performed. This allows the flexibility for a future implementation in the accelerator mode, as well.

At 420 the i390 firmware then generates the common request reply message with a reply code, such as "00". At 425 the i390 firmware stores the common reply message into the target AP queue. Returning to 410, for an AP crypto adapter not configured in accelerator mode, at 430 the i390 code converts the common ZAPD command request message into the mode-specific form of the DZ request message that the AP crypto adapter understands. That is: the i390 code creates and populates a CPRB and a verb request block (VRB) with the DZ verb and parameters. Part of the AP crypto adapter i390 firmware runs on the processor, and a portion of the i390 firmware executes on the AP crypto adapter. The i390 firmware parses the message payload and issues the correct form of the command, and detail validation occurs. This includes verifying the payload contents for presence and correctness of required values, and that the contents are consistent with the command request and with the AP crypto adapter's configuration mode. The ZAPD command is independent of the specific mode of configuration. Each mode has a different agent program, including different command formats. Therefore, the i390 translation from the AP crypto adapter format to an abstracted response independent of mode satisfies a requirement to be both generic, and provide future compatibility should formats change.

Figure 5:
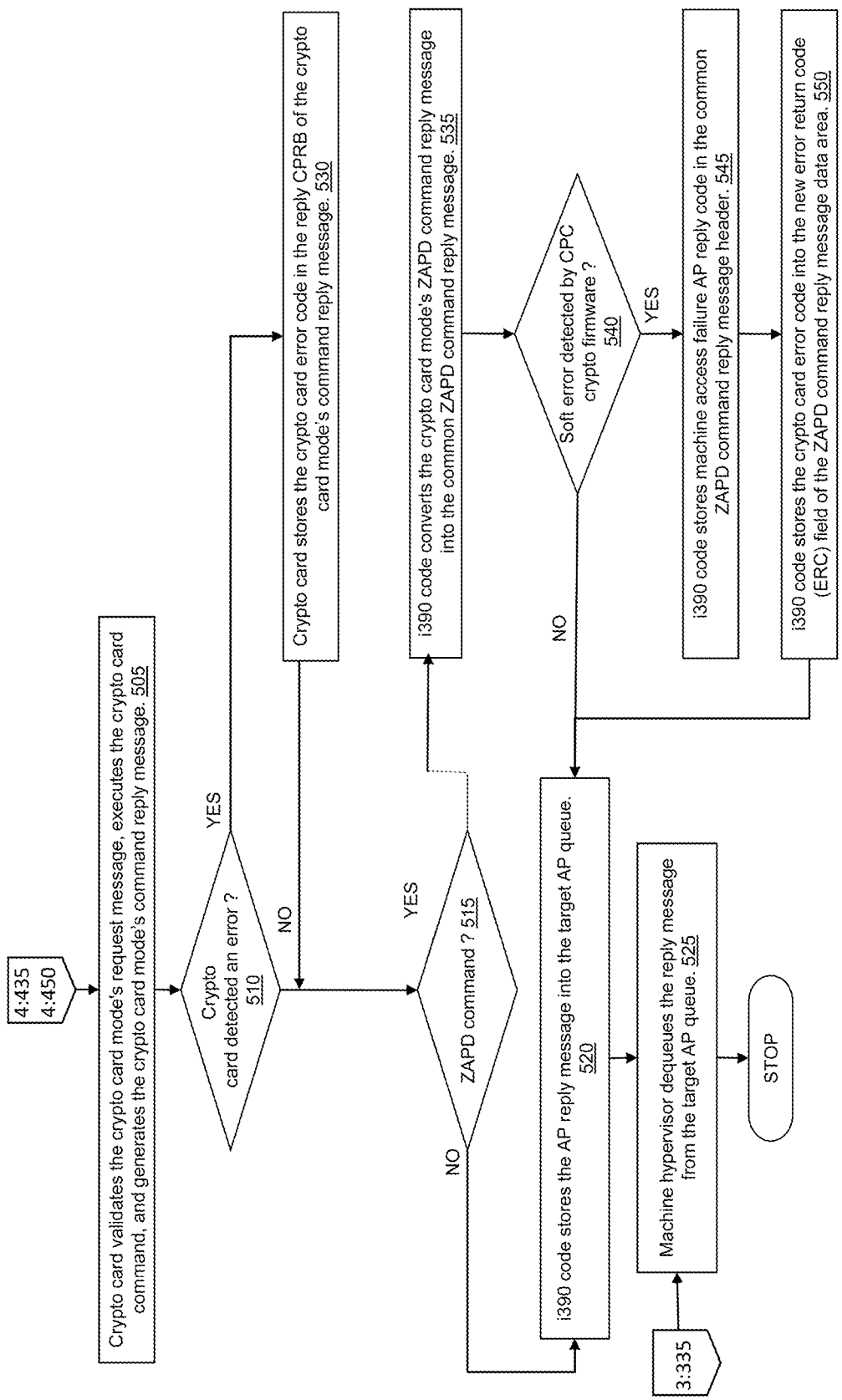
FIG. 5 illustrates a view of executing the zeroize command by the CEX adapter, the processing of the reply by the machine, and returning the execution results to the machine hypervisor, according to an embodiment of the present invention.

FIG. 5 illustrates a view of executing the zeroize command and returning the execution results to the machine hypervisor. Generally, the portion of the crypto card firmware that executes on the AP crypto adapter validates and executes the command request message, and generates the command reply message corresponding to the configured mode of the AP crypto adapter (505). The result of a successful execution is the writing of null values, or similar pattern, to the available storage area on the AP crypto adapter.

At 510, if there was a detected error, then at 530 the error code is stored in the connectivity programming request block (CPRB) of the AP crypto adapter's command reply message if the command execution is unsuccessful. For a ZAPD command (515) the i390 firmware converts the command reply message corresponding to the configured mode of the APAP crypto adapter into the common command reply message (535). There are two categories of errors reported by the crypto card. The first category is soft errors that are detected by the AP crypto adapter and indicated in the reply CPRB. This will usually indicate some form of recoverable soft failure. The second category is hard errors that prohibits the transfer of the request to the AP crypto adapter or within the AP crypto adapter itself. This can be, for example, temporary unavailability due to PCI bus switch for service or failover reasons or AP crypto adapter internal errors. This will usually indicate some form of non-recoverable hard failure that results in a machine-failure. We happen to use the same error code (x10) that is referred to as machine-failure, but in the case of these administrative commands x10 is more general. At 540, the soft error is detected, and the i390 firmware stores the soft error code in the header of the common command reply message (545). The i390 firmware then stores the AP crypto adapter error code into the error return code field of the command reply message data area (550). Processing then continues at 520.

Returning to 540, if a soft error is not detected, the i390 firmware stores the command reply message in the AP crypto adapter's firmware's internal storage (520). At 525 the hypervisor dequeues the reply message from the target AP queue.

At 515, for a non-ZAPD command, the i390 firmware stores the command reply message in the AP crypto adapter's firmware's internal storage (520), and the hypervisor dequeues the common ZAPD command reply message from the target AP queue (525).

Figure 6:
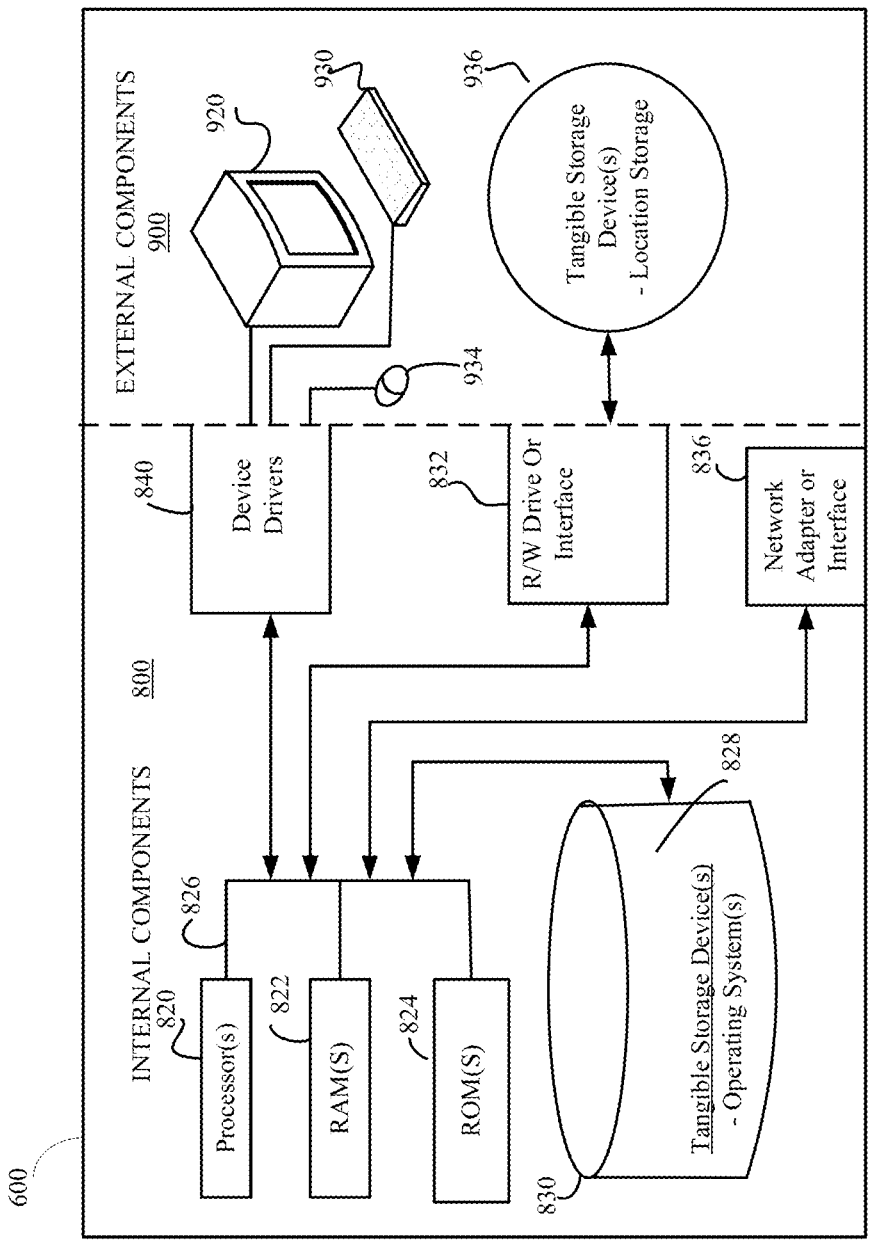
FIG. 6 illustrates an exemplary computing device 500 applicable for executing the algorithm of FIGS. 2-5.

FIG. 6 illustrates an exemplary computing device 600 applicable for executing the algorithm of FIGS. 2-5. Computing device 500 may include respective sets of internal components 800 and external components 900 that together may provide an environment for a software application. Each of the sets of internal components 800 includes one or more processors 820; one or more computer-readable RAMs 822; one or more computer-readable ROMs 824 on one or more buses 826; one or more operating systems 828 executing the algorithm of FIGS. 2-5; and one or more computer-readable tangible storage devices 830. The one or more operating systems 828 are stored on one or more of the respective computer-readable tangible storage devices 830 for execution by one or more of the respective processors 820 via one or more of the respective RAMs 822 (which typically include cache memory). In the embodiment illustrated in FIG. 6, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage device(s) 936 such as a CD-ROM, DVD, SSD, USB memory stick, and magnetic disk.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The operating system 828 that is associated with computing device 600, can be downloaded to computing device 600 from an external computer (e.g., server) via a network (for example, the Internet, a local area network, or other wide area network) and respective network adapters or interfaces 836. From the network adapters (or switch port adapters) or interfaces 836 and operating system 828 associated with computing device 600 are loaded into the respective hard drive 830 and network adapter 836.

External components 900 can also include a touch screen 920 and pointing devices 930. The device drivers 840, RAY drive or interface 832 and network adapter or interface 836 comprise hardware and software (stored in storage device 830 and/or ROM 824).

Various embodiments of the invention may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flow diagrams depicted herein are just one example. There may be many variations to this diagram, or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be constructed to maintain the proper protection for the invention first described.

What is claimed is:

1. A method, comprising:

a machine hypervisor building and enqueuing a zeroize adjunct processor (AP) domain (ZAPD) common command request message to a target AP domain queue;

machine firmware validating the enqueued ZAPD common command request message on the target AP domain queue;

processor millicode converting the enqueued ZAPD common command request message to a format corresponding to a configured mode of an AP crypto adapter command request message;

executing the converted enqueued ZAPD common command request message at an AP crypto adapter of the target AP domain, wherein the crypto adapter is assigned to a virtual machine, and wherein the executing includes zeroizing a storage area of the AP crypto adapter by deleting secret keys assigned to the virtual machine from the AP crypto adapter; and returning execution results to the machine hypervisor.

2. The method of claim 1, wherein building and enqueuing the ZAPD command request message further comprises:

verifying a ZAPD command is installed for the target AP domain, and that a control domain and a usage domain are enabled for the target AP domain;

building, by the machine hypervisor, an abstracted common command request message wherein a format of the ZAPD common command request message is independent of a configuration mode of an AP crypto adapter;

setting an indicator in the ZAPD common command request message to bypass parsing of the ZAPD common command request message; and setting an AP queue index to target AP domain, wherein the AP queue index corresponds to a domain number within the AP crypto adapter.

3. The method of claim 1, wherein the validating further comprises:
    based on having both control domain and usage domain access, storing the ZAPD common command request message on the AP crypto adapter of the target AP domain;
    in response to a mismatch between the setting of the indicator in the ZAPD common command request message and the ZAPD common command request being ZAPD, generating a common command reply message, wherein a header of the common command reply message includes an error reply code; and
    storing the ZAPD common command request message on the AP crypto adapter of the target AP domain.

4. The method of claim 1, wherein the converting the enqueued ZAPD common command request message further comprises:
    based on a configuration mode of the AP crypto adapter being accelerator mode, simulating the ZAPD common command request as a non-operation;
    generating a common command reply message, wherein a normal completion reply code is stored in a header of the common command reply message; and
    storing the common command reply message on the AP crypto adapter of the target AP domain.

5. The method of claim 4, further comprising:
    based on the configuration mode of the AP crypto adapter being other than accelerator mode, executing the ZAPD common command request message; and
    firmware parsing the ZAPD common command request message and generating a resulting ZAPD command request message in a format corresponding to the configuration mode of the AP crypto adapter.

6. The method of claim 1, wherein executing the command request message at an AP crypto adapter of the target AP domain further comprises:
    validating, then executing, contents of the command request message;
    in response to an error in the executing, the AP crypto adapter storing an error reply code in a connectivity programming request block of the command reply message;
    based on the command request message being ZAPD, converting the command reply message to a common command reply message format corresponding to the configuration mode of the AP crypto adapter;
    in response to a machine failure being returned for a ZAPD error, storing the machine failure in a header of the common command reply message; and dequeuing the command reply message from the AP crypto adapter of the target domain.

7. The method of claim 1, wherein the configuration mode of an AP crypto adapter includes accelerator, Common Cryptographic Architecture (CCA, and Public-Key Cryptographic Standards (PKCS) #11 (XCP).

8. A computer program product, the computer program product comprising a non-transitory tangible storage device having program code embodied therewith, the program code executable by a processor of a computer to perform a method, the method comprising:
    a machine hypervisor building and enqueuing a zeroize adjunct processor (AP) domain (ZAPD) common command request message to a target AP domain queue;
    machine firmware validating the enqueued common command request message on the target AP domain queue;
    machine firmware converting the enqueued common ZAPD command request message to a mode-specific form of the domain zeroize request;
    executing the converted enqueued ZAPD command request message at an AP crypto adapter of the target AP domain, wherein the crypto adapter is assigned to a virtual machine, and wherein the executing includes zeroizing a storage area of the AP crypto adapter by deleting secret keys assigned to the virtual machine from the AP crypto adapter;
    the AP crypto adapter returning execution results to the machine firmware;
    machine firmware converting the AP crypto adapter ZAPD command reply message into the common ZAPD command reply message; and
    returning final execution results including the converted common ZAPD command reply message to the machine hypervisor.

9. The computer program product of claim 8, wherein building and enqueuing the ZAPD command request message further comprises:
    verifying a ZAPD command is installed for the target AP domain, and that a control domain and a usage domain are enabled for the target AP domain;
    building, by the machine hypervisor, an abstracted common command request message wherein a format of the ZAPD common command request message is independent of a configuration mode of an AP crypto adapter;
    setting an indicator in the ZAPD common command request message to bypass parsing of the ZAPD common command request message; and
    setting an AP queue index to target AP domain, wherein the AP queue index corresponds to a domain number within the AP crypto adapter.

10. The computer program product of claim 8, wherein the validating further comprises:
    based on having both control domain and usage domain access, storing the ZAPD common command request message on the AP crypto adapter of the target AP domain;
    in response to a mismatch between the setting of the indicator in the ZAPD common command request message and the ZAPD common command request being ZAPD, generating a common command reply message, wherein a header of the common command reply message includes an error reply code; and
    storing the ZAPD common command request message on the AP crypto adapter of the target AP domain.

11. The computer program product of claim 8, wherein the converting the enqueued ZAPD common command request message further comprises:
    based on a configuration mode of the AP crypto adapter being accelerator mode, simulating the ZAPD common command request as a non-operation;
    generating the ZAPD common command reply message, wherein a normal completion reply code is stored in a header of the common command reply message; and
    storing the common command reply message on the AP crypto adapter of the target AP domain.

12. The computer program product of claim 11, further comprising:
    based on the configuration mode of the AP crypto adapter being other than accelerator mode, executing the ZAPD common command request message;
    firmware parsing the ZAPD common command request message and generating a resulting ZAPD command request message in a format corresponding to the configuration mode of the AP crypto adapter; and firmware signing the ZAPD command request message using secret keys of the AP target domain.

13. The computer program product of claim 8, wherein executing the command request message at an AP crypto adapter of the target AP domain further comprises:

validating, then executing, contents of the command request message;

in response to an error in the executing, the AP crypto adapter storing an error reply code in a connectivity programming request block of the command reply message;

based on the command request message being ZAPD, converting the command reply message to the ZAPD common command reply message format corresponding to a configuration mode of the AP crypto adapter;

in response to a machine failure being returned for a ZAPD error, storing the machine failure in in the a header of the common command reply message; and dequeuing the command reply message from the AP crypto adapter of the target domain.

14. A computer system, comprising:

one or more processors;

a memory coupled to at least one of the processors;

a set of computer program instructions stored in the memory and executed by at least one of the processors in order to perform actions of:

a machine hypervisor building and enqueuing a zeroize adjunct processor (AP) domain (ZAPD) common command request message to a target AP domain queue;

machine firmware validating the enqueued ZAPD common command request message on the target AP domain queue;

processor millicode converting the enqueued ZAPD common command request message to a format corresponding to a configured mode of an AP crypto adapter command request message;

executing the converted enqueued ZAPD common command request message, including executing the converted enqueued ZAPD common request message at an AP crypto adapter of the target AP domain, wherein the crypto adapter is assigned to a virtual machine, and wherein the executing includes zeroizing a storage area of the AP crypto adapter by deleting secret keys assigned to the virtual machine from the AP crypto adapter; and returning execution results to the machine hypervisor.

15. The computer system of claim 14, wherein building and enqueuing the ZAPD command request message further comprises:

verifying a ZAPD command is installed for the target AP domain, and that a control domain and a usage domain are enabled for the target AP domain;

building, by the machine hypervisor, an abstracted ZAPD common command request message wherein a format of the ZAPD common command request message is independent of a configuration mode of an AP crypto adapter;

setting an indicator in the ZAPD common command request message to bypass parsing of the ZAPD common command request message; and setting an AP queue index to target AP domain, wherein the AP queue index corresponds to a domain number within the AP crypto adapter.

16. The computer system of claim 14, wherein the validating and further comprises:

based on having both control domain and usage domain access, storing the ZAPD common command request message on the AP crypto adapter of the target AP domain;

in response to a mismatch between the setting of the indicator and the ZAPD common command request being ZAPD, generating a common command reply message, wherein a header of the common command reply message includes an error reply code; and storing the ZAPD common command request message on the AP crypto adapter of the target AP domain.

17. The computer system of claim 14, wherein the converting the enqueued ZAPD common command request message further comprises:

based on the configuration mode of the AP crypto adapter being accelerator mode, simulating the ZAPD common command request as a non-operation;

generating a common command reply message, wherein a normal completion reply code is stored in a header of the common command reply message; and storing the common command reply message on the AP crypto adapter of the target AP domain.

18. The computer system of claim 17, further comprising:

based on the configuration mode of the AP crypto adapter being other than accelerator mode, executing the ZAPD common command request message; and firmware parsing the ZAPD common command request message and generating a resulting ZAPD command request message in a format corresponding to the configuration mode of the AP crypto adapter.

19. The computer system of claim 14, wherein executing the command request message at an AP crypto adapter of the target AP domain further comprises:

validating, then executing, contents of the command request message;

in response to an error in the executing, the AP crypto adapter storing an error reply code in a connectivity programming request block of the command reply message;

based on the command request message being ZAPD, converting the command reply message to the ZAPD common command reply message format corresponding to the configuration mode of the AP crypto adapter;

in response to a machine failure being returned for a ZAPD error, storing the machine failure in in the a header of the common command reply message; and dequeuing the command reply message from the AP crypto adapter of the target domain.

20. The computer system of claim 14, wherein the configuration mode of an AP crypto adapter includes accelerator, Common Cryptographic Architecture (CCA, and Public-Key Cryptographic Standards (PKCS) #11 (XCP).

* * * * *